US009609666B2

(12) United States Patent
Sun et al.

(10) Patent No.: US 9,609,666 B2
(45) Date of Patent: Mar. 28, 2017

(54) SYSTEM AND METHOD FOR RESERVING A CHANNEL FOR COEXISTENCE OF U-LTE AND WI-FI

(71) Applicant: Futurewei Technologies, Inc., Plano, TX (US)

(72) Inventors: Yishen Sun, Buffalo Grove, IL (US); Hao Bi, Lake Zurich, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 67 days.

(21) Appl. No.: 14/634,477

(22) Filed: Feb. 27, 2015

(65) Prior Publication Data

US 2015/0250002 A1    Sep. 3, 2015

Related U.S. Application Data

(60) Provisional application No. 61/947,304, filed on Mar. 3, 2014.

(51) Int. Cl.
*H04B 7/212* (2006.01)
*H04W 74/08* (2009.01)
*H04W 16/14* (2009.01)

(52) U.S. Cl.
CPC ........ *H04W 74/0808* (2013.01); *H04W 16/14* (2013.01)

(58) Field of Classification Search
CPC ..... H04B 7/2123; H04B 7/212; H04W 72/04; H04W 88/08; H04W 76/00; H04W 84/08; H04W 76/02; H04W 80/04; H04W 8/26; H04W 28/26; H04W 72/0446; H04J 3/1694; H04J 3/16

USPC .......................... 370/322, 329, 341, 349, 443
See application file for complete search history.

(56) References Cited

U.S. PATENT DOCUMENTS

| 2009/0122765 A1* | 5/2009 | Dimou ................. H04W 88/06 370/336 |
| 2014/0112289 A1 | 4/2014 | Kim et al. |

FOREIGN PATENT DOCUMENTS

| CN | 101568183 A | 10/2009 |
| CN | 101925138 A | 12/2010 |
| CN | 103402201 A | 11/2013 |
| WO | 2012172157 A1 | 12/2012 |
| WO | 2013006006 A2 | 1/2013 |
| WO | 2013185835 A1 | 12/2013 |
| WO | WO 2013/179095 A1 | 12/2013 |

OTHER PUBLICATIONS

Samsung, "Resource allocation for D2D broadcast communication," 3GPP TSG RAN WG1 Meeting #76, R1-140390, Prague, Czech Republic, Feb. 10-14, 2014, 6 pages.

* cited by examiner

*Primary Examiner* — Brenda H Pham
(74) *Attorney, Agent, or Firm* — Slater Matsil, LLP

(57) ABSTRACT

A shared-channel device is configured to perform a method for reserving a shared channel in a wireless communication system. The method includes, upon a determination to utilize a shared channel for payload data communication starting at a first time, calculating a push-forward duration. The method also includes performing a channel reservation procedure to reserve the shared channel, wherein the channel reservation procedure is started at a second time that is before the first time by the push-forward duration.

30 Claims, 5 Drawing Sheets

SYSTEM AND METHOD FOR RESERVING A CHANNEL FOR COEXISTENCE OF U-LTE AND WI-FI

CROSS-REFERENCE TO RELATED APPLICATION(S) AND CLAIM OF PRIORITY

This application claims priority under 35 U.S.C. §119(e) to U.S. Provisional Patent Application No. 61/947,304, filed Mar. 3, 2014, entitled "CHANNEL RESERVATION MECHANISM FOR THE COEXISTENCE OF U-LTE AND WIFI", which is hereby incorporated by reference into this application as if fully set forth herein.

TECHNICAL FIELD

The present disclosure relates generally to wireless communications, and more particularly, to a system and method for reserving a channel for coexistence of unlicensed Long Term Evolution (U-LTE) and Wi-Fi.

BACKGROUND

The amount of data traffic exchanged between wireless communication devices continues to grow rapidly. The ever-increasing traffic loads lead to a pressing need for additional spectral resources of cellular systems. In order to meet the capacity requirements caused by the increase in data traffic, operators are deploying more small cells and utilizing all available spectrum resources. While mobile broadband in licensed spectrum is highly efficient due to its exclusive occupancy of the spectrum, the amount of available licensed spectrum can be limited and costly. Bandwidth-rich unlicensed spectrum can be used to effectively augment the capacity.

LTE is currently among the most advanced mobile telecommunication technologies. LTE operating in licensed spectrum is prominently deployed across the world. To further expand LTE capacity to meet growing traffic demands, developers are looking to integrate unlicensed carriers into LTE systems by adapting LTE air interfaces to operate in the unlicensed spectrum. This is often referred to as Unlicensed LTE (U-LTE), or LTE License Assisted Access (LTE-LAA).

SUMMARY

According to one embodiment, there is provided a method for reserving a shared channel in a wireless communication system. The method includes, upon a determination to utilize the shared channel for payload data communication starting at a first time, calculating a push-forward duration. The method also includes performing a channel reservation procedure to reserve the shared channel, wherein the channel reservation procedure is started at a second time that is before the first time by the push-forward duration.

According to another embodiment, there is provided a shared-channel device configured for reserving a shared channel in a wireless communication system. The shared-channel device includes at least one memory and at least one processor coupled to the at least one memory. The at least one processor is configured to, upon a determination to utilize the shared channel for payload data communication starting at a first time, calculate a push-forward duration. The at least one processor is further configured to control the shared-channel device to perform a channel reservation procedure to reserve the shared channel, wherein the channel reservation procedure is started at a second time that is before the first time by the push-forward duration.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of this disclosure provide a channel reservation mechanism for use in wireless communication systems where multiple devices utilize radio resources of the same shared channel by competing for the channel access and resources first, such as unlicensed Long Term Evolution (U-LTE) systems, Wi-Fi systems, or mixed systems with both U-LTE devices and Wi-Fi devices. In such shared channel wireless communication systems, different devices may implement different channel reservation/access mechanisms. One important challenge is to ensure the fair coexistence among devices with different channel reservation/access mechanisms. Another requirement for these shared channel devices is that regional regulations shall be followed, e.g., the Listen before Talk (LBT) regulations in Europe. The disclosed channel reservation procedures may be used by U-LTE devices to fulfill LBT requirements while achieving fair coexistence with Wi-Fi devices. The disclosed embodiments are also applicable for use in LTE License Assisted Access (LTE-LAA) systems. Although there are some differences between U-LTE and LTE-LAA, the embodiments disclosed herein are suitable for both.

Figure 1:
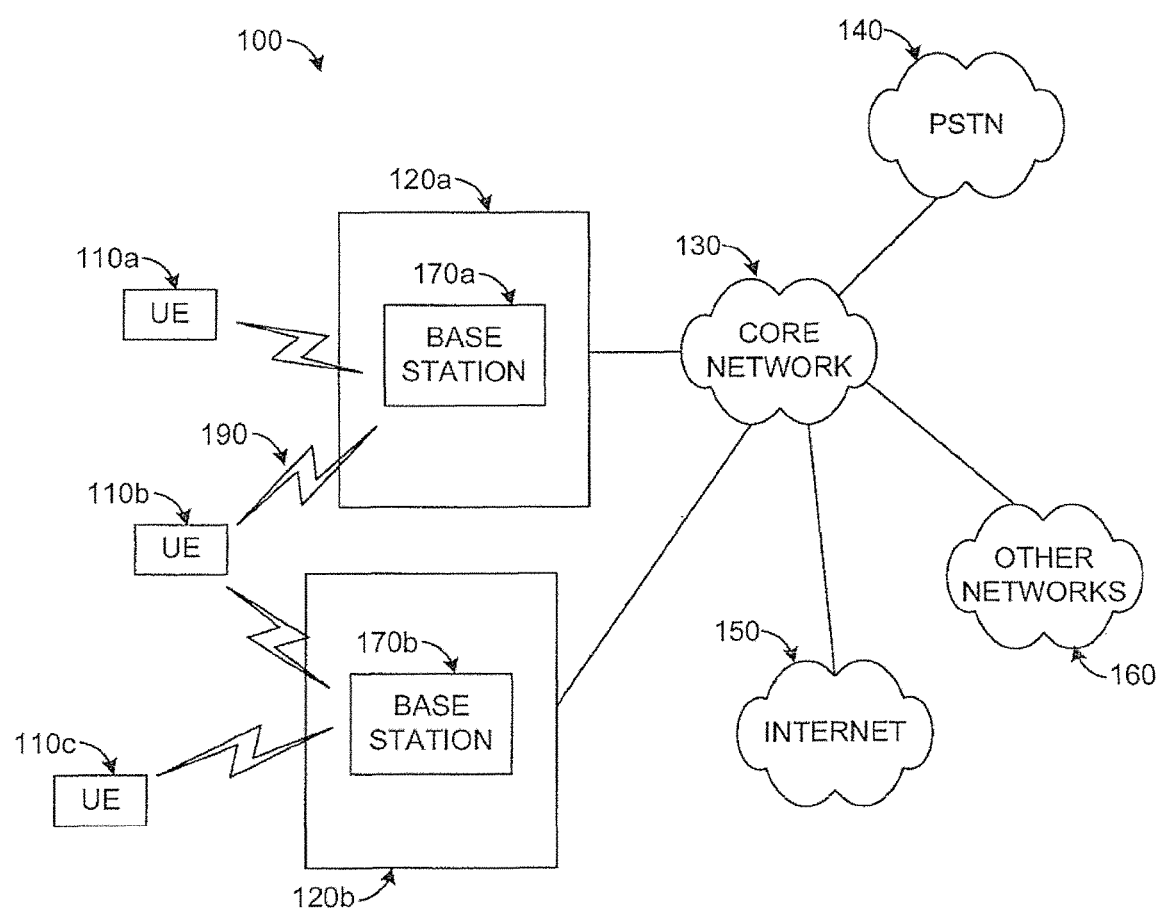
FIG. 1 illustrates an example communication system that that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

The base stations 170a-170b communicate with each other or with other base stations over either wireless or wired communication links. In addition, the base stations 170a-170b may belong to the same operator or different operators, and consequently coordinate with each other or not coordinate.

It is contemplated that the system 100 may use multiple channel access functionality, including such schemes as described herein. In particular embodiments, the base stations 170a-170b and UEs 110a-110c are configured to implement LTE, LTE-A, LTE-LAA, and/or LTE-B. Additionally, in accordance with this disclosure, one or more of the base stations 170a-170b and UEs 110a-110c are configured to communicate according to the standards and principles described below. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
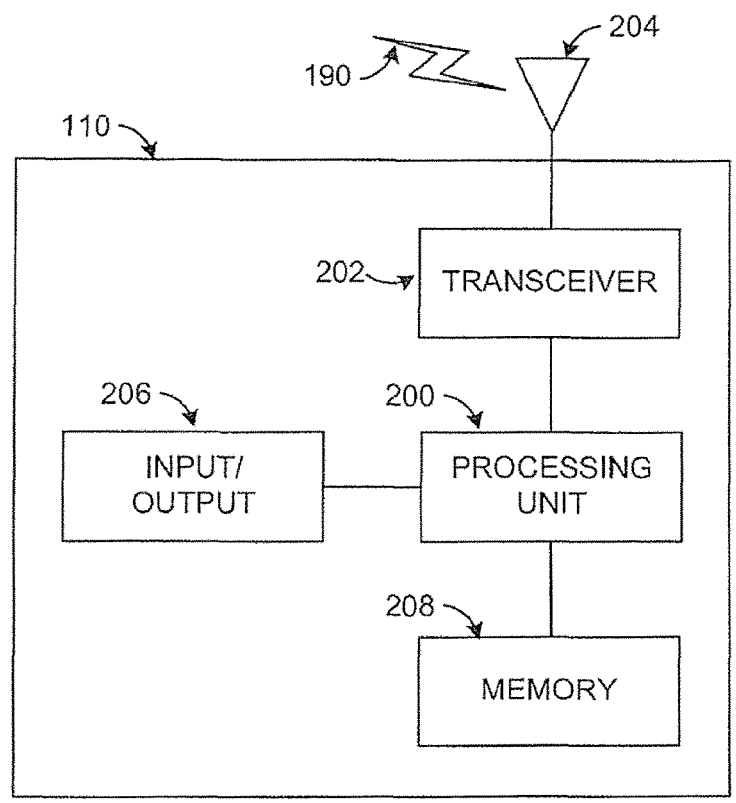
FIGS. 2A and 2B illustrate example devices that may be used for implementing the methods and teachings disclosed herein.
Figure 2B:
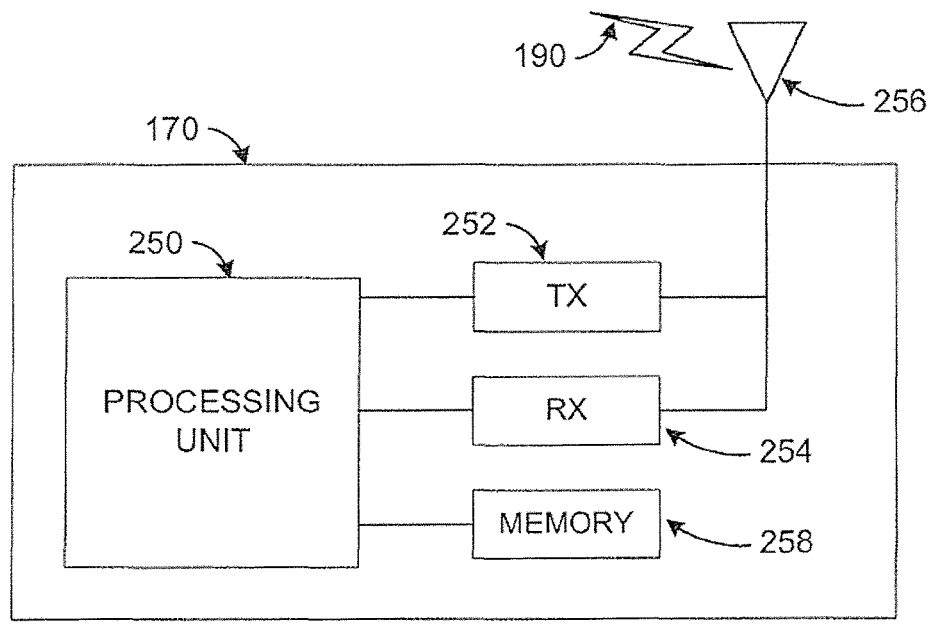

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Figure 3:
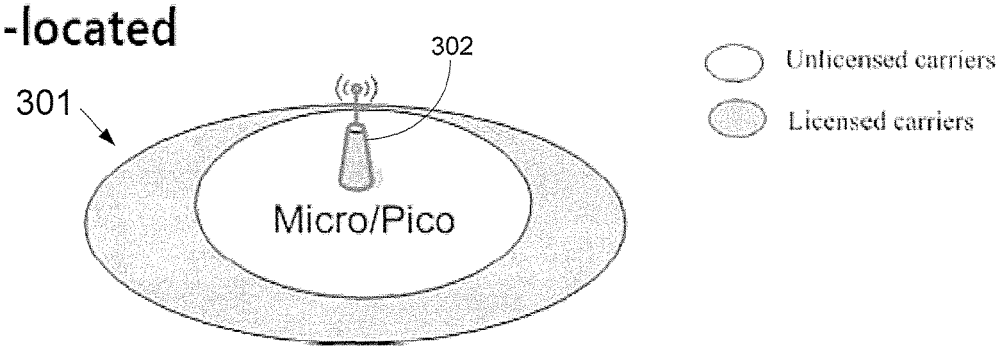
FIG. 3 illustrates example deployment scenarios of U-LTE networks.
Figure 3:
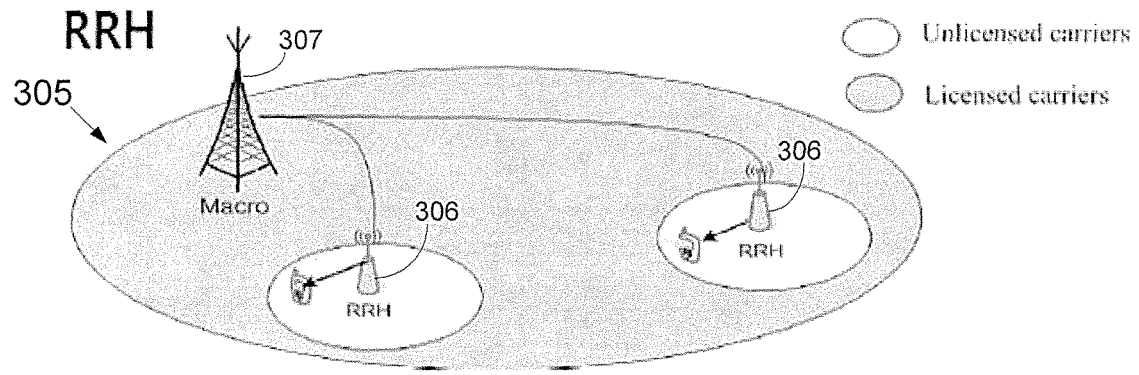

FIG. 3 illustrates example deployment scenarios of U-LTE networks. As shown in FIG. 3, network 301 includes a co-located deployment, where a base station 302 provides service coverage through both licensed carriers and unlicensed carriers. Network 305 includes a remote radio head (RRH) deployment, where one or more RRHs 306 are deployed away from (but still in communication with) a macro base station 307. Each RRH 306 provides service in its coverage area through unlicensed carriers, while the macro base station 307 provides service in its coverage area through licensed carriers. Some of the advantages of U-LTE include supporting unlicensed carriers paired with licensed carriers, and integrating unlicensed spectrum into operator networks to achieve LTE-based unlicensed carrier offloading. However, challenges exist regarding fairness and effectiveness with respect to coexistence with Wi-Fi.

In addition, many countries or regions have various regulatory requirements on accessing a shared radio channel, e.g., unlicensed carriers, such as those associated with "Listen Before Talk" (LBT). LBT is a requirement in which a device or equipment applies clear channel assessment (CCA) before using the shared channel. In Europe, shared-channel equipment is classified as either Frame Based Equipment (FBE) or Load Based Equipment (LBE). Operations of each type of equipment are governed by certain regulatory requirements associated with that type. For example, in Europe, regulations require FBE to have a CCA observation time (the minimum time that a device needs to listen to a channel before transmitting) that is greater than or equal to 20 μs; a Channel Occupancy Time of between 1 ms and 10 ms; and a Minimum Idle Period that is greater than 5% of the Channel Occupancy Time. European regulations also require LBE to have a CCA observation time that is greater than or equal to 20 μs; a Time back off equal to N*Channel Occupancy Time, where N~[1,q], q=4 or 32; and a Channel Occupancy Time that is less than ($13/32$)*q ms. In other regions, other regulatory requirements may apply, or these requirements may be known by other names.

Figure 4:
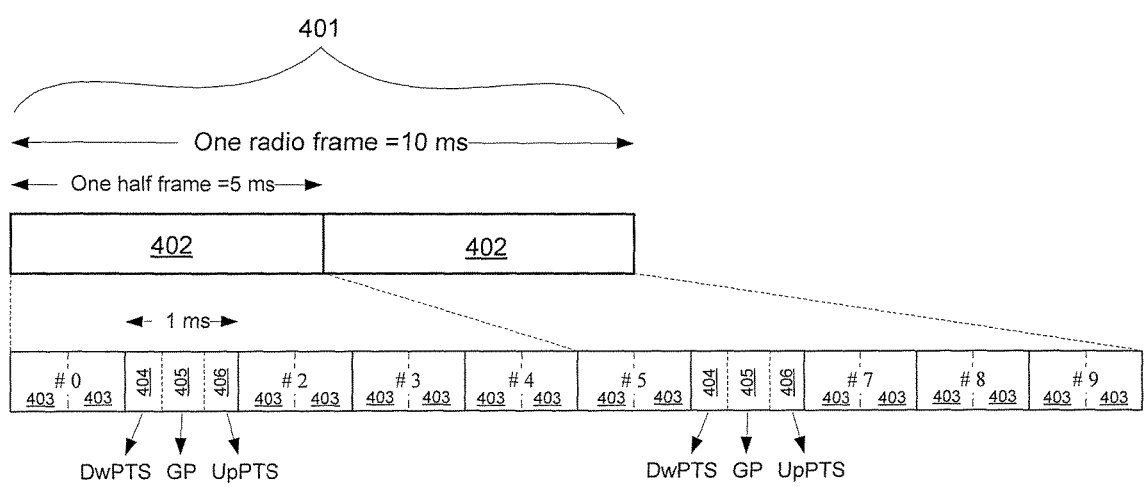
FIG. 4 illustrates an example of the frame structure for LTE time division duplex (TDD) mode.

FIG. 4 illustrates an example frame structure for LTE time division duplex (TDD) mode. In LTE TDD, the uplink and the downlink are divided into radio frames. As shown in FIG. 4, a radio frame 401 is 10 ms in length. Each frame 401 includes two half-frames 402 that are each 5 ms in length. Depending on the configuration, each half-frame 402 consists of either ten slots 403, or eight slots 403 plus three fields (a downlink pilot time slot (DwPTS) 404, a guard period (GP) 405, and an uplink pilot time slot (UpPTS) 406) in a special subframe, as shown in FIG. 4.

In LTE TDD, uplink and downlink transmissions are separated in the time domain. There are restrictions as to which subframes can be used for which transmission direction. The guard period (GP) is a reserved period for downlink to uplink transition. Other subframes/fields are assigned for either downlink or uplink transmission. Table 1 shows various uplink/downlink subframe allocations in a LTE TDD frame. As shown in Table 1, both 5 ms and 10 ms switch-point periodicity are supported. The radio frame 401 shown in FIG. 4 is an example of 5 ms switch-point periodicity, and may correspond to one of Configurations 0, 1, 2, or 6 in Table 1.

TABLE 1

Uplink-Downlink allocations of LTE TDD frame

| Config-uration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In U-LTE, a channel reservation mechanism can be used to determine whether or not a channel is busy, and reserve the channel for one or more U-LTE devices if the channel is free. The content of the channel reservation signaling used by U-LTE devices is understandable by U-LTE devices. Thus, such a channel reservation mechanism is sufficient for a system that includes only U-LTE devices. However, some systems include both U-LTE and Wi-Fi devices, such that one or more channels are shared between U-LTE and Wi-Fi. Some Wi-Fi devices (either access point (AP) or station (STA)) cannot or are not required to interpret certain U-LTE-compatible signaling, such as the channel reservation signaling. Therefore, channel reservation mechanisms need to be enhanced for U-LTE systems where one or more channels are shared with Wi-Fi. The signaling that is used to reserve the shared channel may be fully understood only by devices which support U-LTE operations.

Accordingly, a channel reservation mechanism is needed for U-LTE devices in order to provide satisfactory coexistence between Wi-Fi and LTE. Such a channel reservation mechanism should provide fair competition between Wi-Fi and LTE, not be too aggressive or too passive, and not jeopardize the opportunity of U-LTE devices accessing a free shared channel.

Embodiments of this disclosure provide systems and methods for a push-forward channel reservation mechanism. In accordance with the disclosed embodiments, the U-LTE device starts the observation and reservation of a channel a predetermined amount of time before the preferred beginning of the desired communication (e.g., the beginning of the next sub-frame). This predetermined amount of time is referred to herein as the push-forward duration. When the U-LTE device is unable to reserve the channel, the U-LTE device repeats the reservation attempt until the reservation is successful, becoming more aggressive after each reservation failure. In addition, repetitive channel reservations can be made after a successful initial reservation until the beginning of the actual data transmission, to ensure the coexistence of Wi-Fi and U-LTE devices, as described in greater detail below.

For LTE TDD, since uplink and downlink transmissions are separated in the time domain, the U-LTE device can perform the observation and reservation of channels only in designated subframes. Consequently, a subset of the UL-DL allocation configurations shown in Table 1 is suitable for the disclosed push-forward channel reservation mechanism. For example, for a U-LTE device that plans to transmit in the downlink (e.g., an eNB) under the LTE TDD mode, the UL-DL allocation configuration should be one from the subset {1, 2, 3, 4, 5, 6}. The UL-DL allocation configuration 0 does not include two or more consecutive downlink subframes (one for the channel reservation and one or more for the actual transmission). Similarly, for a U-LTE device that plans to transmit in the uplink (e.g., a UE) under the LTE TDD frame structure shown in Table 1, the UL-DL allocation configuration should be one from the subset {0, 1, 3, 4, 6} assuming an UL transmission may be scheduled and ready in the next subframe as soon as U-LTE devices identify a clean channel in the current subframe. Configurations 2 and 5 do not include two or more consecutive uplink subframes.

Figure 5:
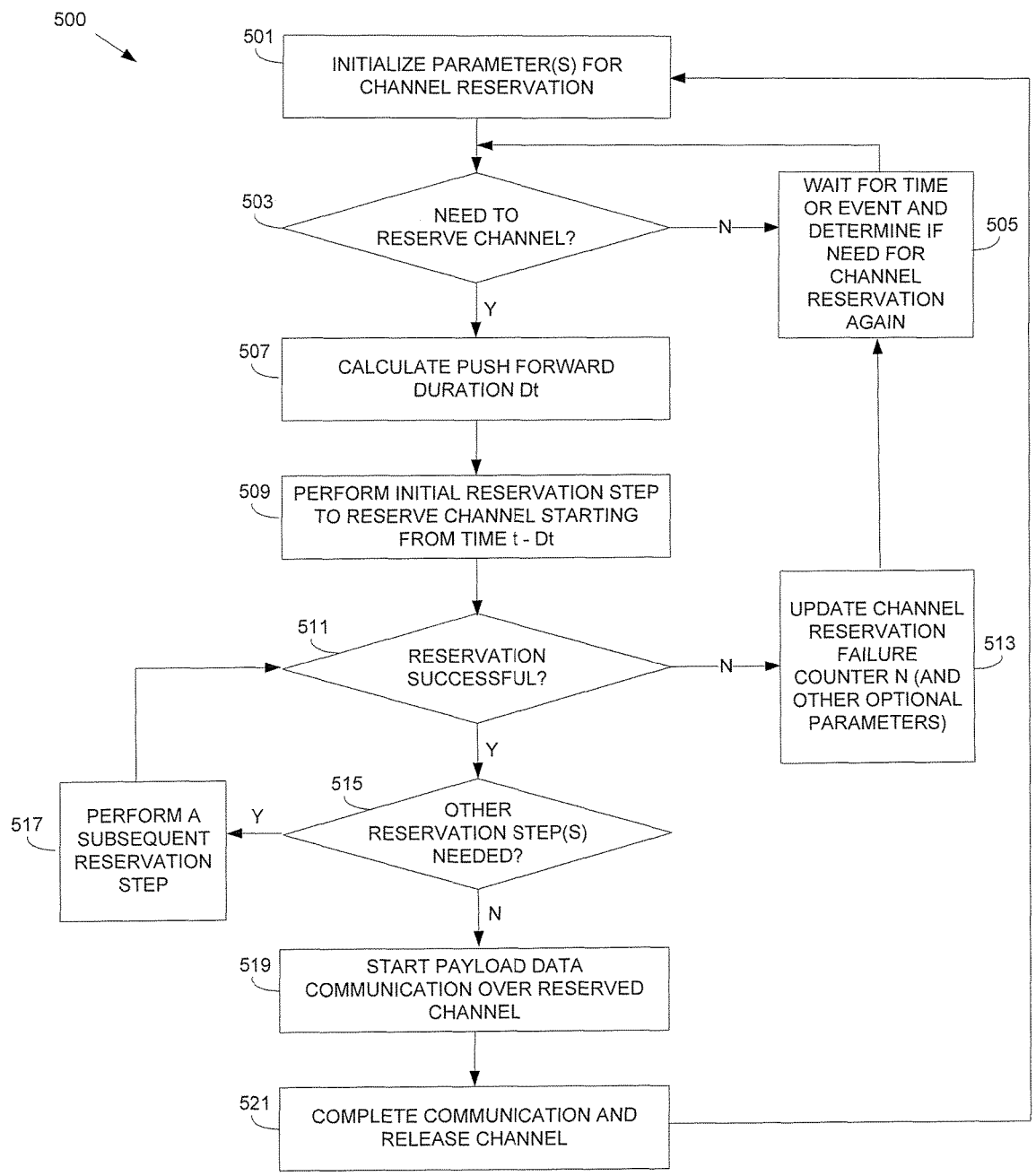
FIG. 5 illustrates an example method for a push-forward channel reservation mechanism according to this disclosure.

FIG. 5 illustrates an example method for push-forward channel reservation according to this disclosure. In some embodiments, the method 500 may be performed by one or more of the components described in FIGS. 1 through 3. However, the method 500 could be used with any other suitable device and in any other suitable system.

At step 501, upon determining to reserve a communication channel, a communication device initializes one or more parameters associated with the channel reservation process. For example, this may include a base station (e.g., one of the base stations 170 or RRHs 306) initializing the channel reservation failure counter N to zero or one.

At step 503, the device determines whether or not there is a need to reserve the channel starting from time t. This may include the base station determining whether there is any payload data to be transmitted or received starting at time t. For example, the base station may determine that there is data queued in a buffer that is ready to be transmitted at time t. As another example, a receiving device may predict that data is scheduled to be transmitted to the receiving device at a particular time (e.g., time t). In other embodiments, the determination may be made according to another suitable method known in the art for determining a need to reserve a channel. In some embodiments, the time t may correspond to a subframe boundary. In other embodiments, the time t may correspond to another time landmark, event, or boundary, such as a half-subframe boundary. If the device determines that there is a need to reserve the channel starting from time t, the method 500 proceeds to step 507. Otherwise, the method 500 proceeds to step 505.

At step 505, upon determining that there is no need to reserve the channel, the device waits for a predetermined time to pass or for a predetermined event to occur, and then returns to step 503 to check again whether or not there is a need for a channel reservation. For example, in some embodiments, a base station may wait until another time slot, subframe, or other interval before attempting to reserve again. As a particular example, the wait may be necessary due to subframe restrictions as shown in Table 1 above. In some embodiments, the device may wait until a predetermined event occurs or may wait to determine if a predetermined event is going to occur, before returning to step 503. In some embodiments, certain events (e.g., a loss of contact between the transmitter and the receiver, obsolescence of the data intended to be transmitted, a licensed carrier assuming data transmission, and the like) may make the channel reservation unnecessary.

At step 507, the device calculates the push-forward duration Dt. The value of Dt may be a function of the channel reservation failure counter N and one or more other parameters or inputs. For example, in some embodiments, Dt=f(N, Tcca, Trts-cts, Twifi), where Tcca is the CCA observation time (as described in LBT regulations), Trts-cts is the minimum time to complete a Request to Send/Clear to Send (RTS/CTS) handshake among two or more U-LTE devices (e.g., among U-LTE base stations, or between a U-LTE base station and a U-LTE UE, or among U-LTE UEs), and Twifi is the maximum duration that a U-LTE device may wait before repeating the channel reservation activity in order to prevent one or more Wi-Fi devices from reserving the channel (as described in greater detail below in step 511). In some embodiments, Trts-cts is determined based on protocol design and network condition, e.g., a round trip time for exchanging RTS/CTS messages between U-LTE devices, the processing time at each device to respond, etc. In some embodiments, Twifi may be set to an extended inter-frame space (EIFS) interval value since a Wi-Fi device will typically wait for an EIFS interval before attempting to make a channel reservation if the Wi-Fi device detects a signal that it cannot interpret.

It will be understood that the RTS/CTS handshake described above is just one example of a two-way handshake procedure to determine whether a reservation step is successful, and a RTS/CTS handshake may be initiated after determining that the shared channel is clean. In other embodiments, it is possible that no handshake is needed, e.g., the device transmits a reservation signal, but does not require feedback or confirmation from other devices. It is also possible that another type of handshake procedure is used instead of RTS/CTS, e.g., a 3-way handshake instead of the 2-way RTS/CTS handshake, or another 2-way handshake with different content. Therefore, Trts-cts may be interpreted as the time needed to determine whether an initial reservation (as described in greater detail below in step 509) is successful or not.

In some embodiments, the calculation of Dt may be according to the following equation:

$$Dt = Tcca + Trts\text{-}cts + N*Twifi. \quad (1)$$

Of course, in other embodiments, the calculation of Dt may be different than shown in Equation (1) and may include parameters other than those described here.

At step 509, the device starts observing the desired channel from a time point before the start time t of the payload data communication by the push-forward duration Dt, in order to determine if the channel is free. If the channel is free, the device attempts to reserve the channel by performing an initial reservation step. Stated mathematically, the device starts observing the shared channel at the time t−Dt, and then performs the initial reservation step by transmitting an initial reservation signal if the channel is free. In some embodiments, the initial reservation step may include a base station exchanging RTS/CTS signals with one or more other U-LTE devices (e.g., other base stations). In some embodiments, the U-LTE device only transmits a one-way reservation signal, but does not require feedback or confirmation from other devices. Any nearby Wi-Fi devices listening on the channel will detect the energy of the initial reservation signal and back off accordingly for a period of time (e.g., for a time corresponding to EIFS).

At step 511, the device determines if the channel reservation is successful. If the channel reservation is successful, the method proceeds to step 515. Otherwise, if the channel reservation is not successful, the method proceeds to step 513. An example of an unsuccessful reservation includes a two-way handshake that is not complete, such as when the device transmits a RTS message but does not receive a CTS message within a certain amount of time. Another example is that the intended receiving UE sends feedback indicating that the shared channel around the UE itself is not in good condition, and thus the channel reservation should be stopped or paused. It is noted that the criteria of determining whether a reservation step is successful may be different between the initial reservation and the subsequent reservation.

During the channel reservation process from time t−Dt to time t, one or more other devices may provide feedback to the device requesting the channel reservation. For example, one or more UEs may provide feedback to a requesting base station, where the feedback informs the base station of the related channel conditions around the UE. In some embodiments, the UE may provide the feedback following the transmission of the initial channel reservation signal. In some embodiments, the UE may continue to provide feedback until the beginning of the actual payload data transmission. In some embodiments, the channel condition feedback from the UE may include the presence of nearby Wi-Fi interference, so that a hidden node problem may be avoided whenever possible. The channel condition feedback may also include a channel quality information (CQI) report, or the like. In some embodiments, the UE may send the channel condition feedback to the base station through a licensed carrier.

At step 513, upon determining that the channel reservation was not successful, the device increases the channel reservation failure counter N. The device also updates any other reservation-related parameters, if necessary. The method then proceeds to step 505, where the device waits for a predetermined time to pass or for a predetermined event to occur, in preparation for attempting the channel reservation again. With each reservation failure, the value of N increases. Based on Equation (1), as N increases with each failure, the calculated value of Dt increases, and thus the time t−Dt (i.e., the time that the device starts observing the shared channel) becomes earlier on each additional channel reservation attempt. Thus, with each failure, the device becomes more aggressive in the channel reservation process, in that the device starts to compete for the channel at an earlier time.

Turning again to step 511, after the successful channel reservation, the channel may be considered tentatively reserved within the network of U-LTE devices; likewise, one or more Wi-Fi devices may have detected the initial reservation signal and backed off for an initial period. However, the (non U-LTE) Wi-Fi devices may not understand and interpret the initial reservation signal as a reservation request. Thus, the back-off period of the Wi-Fi devices may not be very long. Therefore, the reserving U-LTE device may still need to continue transmitting certain signals periodically or continuously to inform listening Wi-Fi devices of activity on the channel, in order to maintain the channel reservation until the actual payload data communication starts at time t.

Thus, in step 515, the device determines whether or not to perform one or more subsequent reservation steps after the initial reservation step. The determination is based on the amount of remaining time after the transmission of the initial reservation signal(s) and before the actual payload data communication starts at time t. If the device determines to perform one or more subsequent reservation steps, the method proceeds to step 517. Otherwise, if the device determines not to perform a subsequent reservation step, the method proceeds to step 519.

In step 517, the device performs a subsequent reservation step after the initial reservation step by transmitting at least one subsequent reservation signal. The subsequent reservation steps may be repeated until time t or shortly before time t. In some embodiments, the subsequent reservation signals may include the same signal as the initial reservation signal. In some embodiments, the subsequent reservation signals may include one or more RTS/CTS handshake signals. In other embodiments, the subsequent reservation signals may include another suitable signal with enough energy to be detected by a Wi-Fi device. After the device performs one subsequent reservation step, the method returns to step 511 to determine if the reservation is still successful.

At step 519, after determining that the channel reservation was successful and no more reservation steps need to be performed, the device starts communication over the reserved channel at time t. This may include transmitting or receiving payload data over the reserved channel. As used herein, payload data refers to the essential data that the device is intended to convey or exchange with other devices or the network, such as IP packets or Packet Data Convergence Protocol (PDCP) service data units (SDUs), and is distinguished from the overhead signaling/data which enables/facilitates the transmission or reception process, such as reservation signals or control signals.

At step 521, the device completes the communication and releases the channel. In some embodiments, the device may complete the communication and release the channel upon reaching a predetermined maximum transmission opportunity or maximum transmission duration. For example, the maximum transmission opportunity may correspond to the maximum channel occupancy time specified in the European LBT standards and regulations (e.g., 10 ms for Frame Based Equipment (FBE)). In some embodiments, the initial reservation signal or subsequent reservation signal(s) indicate how long the device wants to reserve the channel (e.g., reserve for one subframe) In other embodiments, a successful channel reservation entitles the device to keep the channel until the maximum transmission opportunity or maximum transmission duration.

Although FIG. 5 illustrates one example of a method 500 for push-forward channel reservation, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

There are some advantageous differences between the push-forward channel reservation methods disclosed herein and the 802.11/Wi-Fi exponential back-off methods performed by some Wi-Fi devices. For example, the start of the back-off time calculated in the Wi-Fi back-off method is from the moment of failure, while the push-forward duration of this disclosure is calculated from the start of the desired communication as planned (e.g., the beginning of a subframe). As another example, in the Wi-Fi back-off method, the Wi-Fi device becomes more passive after each competition failure, while a U-LTE device using the methods disclosed herein becomes more aggressive after each competition failure.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for reserving a shared channel in a wireless communication system by a wireless shared-channel device, the method comprising:
    upon a determination to utilize the shared channel for payload data communication starting at a first time, calculating, by the wireless shared-channel device, a push-forward duration that is a direct function of a channel reservation failure counter;
    performing, by the wireless shared-channel device, a channel reservation procedure to reserve the shared channel, wherein the channel reservation procedure is started at a second time that is before the first time by the push-forward duration; and
    in response to the channel reservation procedure being successful, communicating, by a transceiver of the wireless shared-channel device, data over the reserved shared channel starting at the first time.

2. The method of claim 1, wherein performing the channel reservation procedure comprises:
    performing an initial reservation step to reserve the shared channel, wherein the initial reservation step is performed no earlier than the second time, the initial reservation step comprising transmitting an initial reservation signal.

3. The method of claim 2, wherein performing the channel reservation procedure further comprises:
    performing at least one subsequent reservation step before the first time, wherein each of the at least one subsequent reservation step comprises transmitting a subsequent reservation signal.

4. The method of claim 2, wherein the initial reservation signal is transmitted continuously until the first time.

5. The method of claim 2, wherein performing the initial reservation step comprises exchanging signals with one or more other wireless shared-channel devices.

6. The method of claim 3, wherein the subsequent reservation signal is transmitted continuously until the first time.

7. The method of claim 3, wherein a first of the at least one subsequent reservation step is performed after a wait duration from the transmission of the initial reservation signal, and wherein the remaining subsequent reservation steps, if any, are performed after the wait duration from the transmission of the previous subsequent reservation signal.

8. The method of claim 7, wherein each subsequent reservation step is performed after the previous channel reservation step is successful.

9. The method of claim 3, wherein the push-forward duration further is a function of at least one of: a Listen Before Talk (LBT) clear channel assessment (CCA) observation time, a time to determine whether or not an initial reservation step is successful, or a wait duration of the wireless shared-channel device before transmitting a subsequent reservation signal.

10. The method of claim 9, wherein the wait duration of the wireless shared-channel device is determined based on a Wi-Fi extended inter-frame space (EIFS) interval.

11. The method of claim 3, wherein each of the at least one subsequent reservation step comprises exchanging signals with one or more other wireless shared-channel devices.

12. The method of claim 3, wherein each of the at least one subsequent reservation step comprises transmitting a signal that can be detected by other wireless shared-channel devices following a different channel reservation procedure to access the shared channel.

13. The method of claim 1, further comprising:
    upon a second determination to utilize the shared channel for payload data communication starting at a third time, calculating a second push-forward duration;
    performing a second channel reservation procedure starting at a fourth time that is before the third time by the push-forward duration;
    in response to the second channel reservation procedure not being successful:
        incrementing the channel reservation failure counter;
        recalculating a fifth time at which the wireless shared-channel device determines to start utilizing the shared channel for payload data communication;
        recalculating the second push-forward duration based on the incremented channel reservation failure counter; and
        performing a third channel reservation procedure at a sixth time that is before the fifth time by the recalculated second push-forward duration.

14. The method of claim 1, further comprising:
    resetting the channel reservation failure counter to an initial value.

15. The method of claim 1, further comprising:
    receiving information associated with the shared channel from other wireless shared-channel devices during the channel reservation procedure.

16. A wireless shared-channel device configured for reserving a shared channel in a wireless communication system, the wireless shared-channel device comprising:

a transceiver;

at least one memory; and at least one processor coupled to the at least one memory and the transceiver, the at least one processor configured to:

upon a determination to utilize the shared channel for payload data communication starting at a first time, calculate a push-forward duration that is a direct function of a channel reservation failure counter;

control the wireless shared-channel device to perform a channel reservation procedure to reserve the shared channel, wherein the channel reservation procedure is started at a second time that is before the first time by the push-forward duration; and in response to the channel reservation procedure being successful, control the transceiver of the wireless shared-channel device to communicate data over the reserved shared channel starting at the first time.

17. The wireless shared-channel device of claim 16, wherein performing the channel reservation procedure comprises:

performing an initial reservation step to reserve the shared channel, wherein the initial reservation step is performed no earlier than the second time, the initial reservation step comprising transmitting an initial reservation signal.

18. The wireless shared-channel device of claim 17, wherein performing the channel reservation procedure further comprises:

performing at least one subsequent reservation step before the first time, wherein each of the at least one subsequent reservation step comprises transmitting a subsequent reservation signal.

19. The wireless shared-channel device of claim 17, wherein the initial reservation signal is transmitted continuously until the first time.

20. The wireless shared-channel device of claim 17, wherein performing the initial reservation step comprises exchanging signals with one or more other wireless shared-channel devices.

21. The wireless shared-channel device of claim 18, wherein the subsequent reservation signal is transmitted continuously until the first time.

22. The wireless shared-channel device of claim 18, wherein a first of the at least one subsequent reservation step is performed after a wait duration from the transmission of the initial reservation signal, and wherein the remaining subsequent reservation steps, if any, are performed after the wait duration from the transmission of the previous subsequent reservation signal.

23. The wireless shared-channel device of claim 22, wherein each subsequent reservation step is performed after the previous channel reservation step is successful.

24. The wireless shared-channel device of claim 18, wherein the push-forward duration further is a function of at least one of: a Listen Before Talk (LBT) clear channel assessment (CCA) observation time, a time to determine whether or not an initial reservation step is successful, or a wait duration of the wireless shared-channel device before transmitting a subsequent reservation signal.

25. The wireless shared-channel device of claim 24, wherein the wait duration of the wireless shared-channel device is determined based on a Wi-Fi extended inter-frame space (EIFS) interval.

26. The wireless shared-channel device of claim 18, wherein each of the at least one subsequent reservation step comprises exchanging signals with one or more other shared-channel devices.

27. The wireless shared-channel device of claim 18, wherein each of the at least one subsequent reservation step comprises transmitting a signal that can be detected by other wireless shared-channel devices following a different channel reservation procedure to access the shared channel.

28. The wireless shared-channel device of claim 16, wherein the at least one processor is further configured to:

upon a second determination to utilize the shared channel for payload data communication starting at a third time, calculate a second push-forward duration;

perform a second channel reservation procedure starting at a fourth time that is before the third time by the push-forward duration;

in response to the second channel reservation procedure not being successful:

increment the channel reservation failure counter;

recalculate a fifth time at which the wireless shared-channel device determines to start utilizing the shared channel for payload data communication;

recalculate the second push-forward duration based on the incremented channel reservation failure counter; and control the wireless shared-channel device to perform a third channel reservation procedure at a sixth time that is before the fifth time by the recalculated second push-forward duration.

29. The wireless shared-channel device of claim 16, wherein the at least one processor is further configured to:

reset the channel reservation failure counter to an initial value.

30. The wireless shared-channel device of claim 16, wherein the at least one processor is further configured to:

receive information associated with the shared channel from other wireless shared-channel devices during the channel reservation procedure.

* * * * *